(12) United States Patent
Hwang (10) Patent No.: US 11,831,929 B2
(45) Date of Patent: Nov. 28, 2023

(54) UNMANNED SPORTS RELAY SERVICE METHOD USING CAMERA POSITION CONTROL AND IMAGE EDITING THROUGH REAL-TIME IMAGE ANALYSIS AND APPARATUS THEREFOR

(71) Applicant: MOBILECEN, Seoul (KR)

(72) Inventor: In Soo Hwang, Gyeonggi-do (KR)

(73) Assignee: MOBILECEN, Seoul (KR)

( * ) Notice: Subject to any disclaimer, the term of this patent is extended or adjusted under 35 U.S.C. 154(b) by 0 days.

(21) Appl. No.: 17/909,755

(22) PCT Filed: Oct. 14, 2020

(86) PCT No.: PCT/KR2020/013989
§ 371 (c)(1),
(2) Date: Sep. 6, 2022

(87) PCT Pub. No.: WO2021/177535
PCT Pub. Date: Sep. 10, 2021

(65) Prior Publication Data
US 2023/0106647 A1 Apr. 6, 2023

(30) Foreign Application Priority Data
Mar. 6, 2020 (KR) ........................ 10-2020-0028216

(51) Int. Cl.
*H04N 21/218* (2011.01)
*H04N 21/2187* (2011.01)
(Continued)

(52) U.S. Cl.
CPC ... *H04N 21/21805* (2013.01); *H04N 21/2187* (2013.01); *H04N 21/222* (2013.01);
(Continued)

(58) Field of Classification Search
CPC ......... H04N 21/21805; H04N 21/2187; H04N 21/23418
(Continued)

(56) References Cited

U.S. PATENT DOCUMENTS 7,448,063 B2 * 11/2008 Freeman .............. H04N 7/0882
348/E7.039
2009/0046152 A1 * 2/2009 Aman ................ A63B 71/0605
348/157
(Continued)

FOREIGN PATENT DOCUMENTS

KR 10-2012-0007590 A 1/2012
KR 10-2017-0086493 A 7/2017
(Continued)

OTHER PUBLICATIONS

J. Chen, L. Meng and J. J. Little, "Camera Selection for Broadcasting Soccer Games," 2018 IEEE Winter Conference on Applications of Computer Vision (WACV), Lake Tahoe, NV, USA, 2018, pp. 427-435, doi: 10.1109/WACV.2018.00053. (Year: 2018).*
(Continued)

*Primary Examiner* — Cynthia M Fogg
(74) *Attorney, Agent, or Firm* — Kilpatrick Townsend & Stockton LLP (57) ABSTRACT

Disclosed is a method by which a relay server connected to a plurality of detection cameras and at least one main camera transmits a sports relay broadcast. In particular, the method comprises: in a first detection area among detection areas respectively corresponding to the plurality of detection cameras, detecting a subject by using a first detection camera corresponding to the first detection area; controlling an image capturing position of the at least one main camera to
(Continued)

be directed toward the first detection camera; and transmitting an image captured by the at least one main camera to a terminal.

6 Claims, 8 Drawing Sheets

(51) Int. Cl.
  *H04N 21/234* (2011.01)
  *H04N 23/61* (2023.01)
  *H04N 23/695* (2023.01)
  *H04N 23/90* (2023.01)
  *H04N 21/222* (2011.01)

(52) U.S. Cl.
  CPC ....... *H04N 21/23418* (2013.01); *H04N 23/61* (2023.01); *H04N 23/695* (2023.01); *H04N 23/90* (2023.01)

(58) Field of Classification Search
  USPC .......................................................... 725/116
  See application file for complete search history.

(56) References Cited

U.S. PATENT DOCUMENTS

| | | | |
|---|---|---|---|
| 2012/0154593 A1 | 6/2012 | Anderson | |
| 2014/0245367 A1* | 8/2014 | Sasaki | H04N 21/2343 725/109 |
| 2016/0101358 A1* | 4/2016 | Ibrahim | G06T 7/292 463/31 |
| 2017/0244991 A1* | 8/2017 | Aggarwal | G06V 20/46 |
| 2018/0054659 A1* | 2/2018 | Goswami | H04N 13/243 |
| 2018/0247421 A1* | 8/2018 | DeAngelis | G06V 20/52 |
| 2018/0301169 A1* | 10/2018 | Ricciardi | G11B 27/036 |

FOREIGN PATENT DOCUMENTS

| | | | |
|---|---|---|---|
| KR | 10-1824878 B1 | | 2/2018 |
| KR | 20190124351 A | * | 10/2019 |
| KR | 10-2112517 B1 | | 6/2020 |
| WO | 2019/025833 A1 | | 2/2019 |

OTHER PUBLICATIONS

International Search Report for PCT/KR2020/013989 dated Oct. 9, 2021, all pages.

* cited by examiner

UNMANNED SPORTS RELAY SERVICE METHOD USING CAMERA POSITION CONTROL AND IMAGE EDITING THROUGH REAL-TIME IMAGE ANALYSIS AND APPARATUS THEREFOR

TECHNICAL FIELD

The present invention relates to an unmanned sports relay service method using camera position control and image editing through real-time image analysis and an apparatus therefor, relates to a method of transmitting and producing a video by automatically editing the screen during broadcasting of various sports such as soccer, basketball, and volleyball through real-time image analysis and a camera position control, and relates to a service method to produce relay videos with various screen configurations by applying SAN to automate a part where a sender manually switches the screen using a video mixer while monitoring screens of several cameras when broadcasting from an existing broadcasting company.

BACKGROUND ART

In general, when broadcasting sports broadcasts, multiple cameras are placed at required positions to transmit each camera screen to a central control room, and the central control room monitors incoming camera screens for each channel through a monitor screen that matches the camera one-by-one. Then, an engineer mixes the screens for each channel by using a video mixer according to the signature of producer (PD), and the mixed screen is broadcasted or saved as a video.

Transmission in this way requires a lot of manpower such as a cameraman for each camera and a PD and video mixer engineer in the central control room, and it is difficult to transmit and produce a video at a low cost because the high cost structure with a very high proportion of labor costs is required.

In addition, although it is possible to transmit and produce a video through a small-size broadcast at a low cost using one or two fixed cameras, such a method causes a problem in that it is difficult to switch screens for each camera, and only a fixed screen can be transmitted and recorded. In addition, this method has a problem in that only a very monotonous screen is supplied because the screen is transmitted without a mixing operation of the screen for each camera. Further, the images recorded in this way cause cumbersome to perform a separate video editing process in order to produce videos with various screen configurations.

In order to solve the above problems, the present invention provides a service method, in which the position of each camera is automatically controlled by using the real-time image analysis technology adopting AI machine learning (machine learning) and the screen transmitted from the camera is automatically mixed to produce an image so that it does not require a separate manpower for transmission.

DISCLOSURE

Technical Problem

The present invention provides an unmanned sports relay service method using camera position control and image editing through real-time image analysis and an apparatus therefor.

The technical objects to be achieved in the present invention are not limited to the technical problems mentioned above, and other technical objects not mentioned will be clearly understood by those skilled in the art to which the present invention belongs from the description below.

Technical Solution

According to an embodiment of the present invention, there is provided a method for transmitting a sports relay broadcast using a relay server connected with a plurality of detection cameras and at least one main camera, the method including: detecting a subject in a first detection area among detection areas respectively corresponding to the plurality of detection cameras by using a first detection camera corresponding to the first detection area; controlling an image capturing position of the at least one main camera to be directed toward the first detection camera; and transmitting the image captured by the at least one main camera to the terminal.

The subject may include a ball used in a sports game transmitted through the sports relay broadcast.

In addition, it is possible to transmit an image captured by the first detection camera to a terminal when the subject is detected in the first detection area for a predetermined time or more.

In addition, it is possible to transmit an image captured by at least one main camera to a terminal when it is determined that the subject is out of the first detection area.

In addition, it is possible to transmit an image captured by a second detection camera corresponding to a second detection area to a terminal when it is determined that the subject detected in the second detection area for a predetermined time or more after the subject is out of the first detection area.

In addition, the image capturing position of the at least one main camera may be controlled to face the second detection camera.

In addition, the first detection area may be set based on a capturing range of the first detection camera.

A sports relay broadcast system according to an embodiment of the present invention may include: a plurality of detection cameras for capturing each of different detection areas included in the sports stadium; at least one main camera rotatably installed in a direction of a detection camera corresponding to a detection area where the subject is detected from among the different detection areas; and a relay server configured to detect the subject in a first detection area from among the different detection areas by using a first detection camera corresponding to the first detection area, control an image capturing position of the at least one main camera to be directed toward the first detection camera, transmit an image captured by the first detection camera to a terminal when the subject is detected in the first detection area for a predetermined time or more, and transmit the image captured by the at least one main camera to the terminal when the subject is detected in the first detection area for less than a predetermined time or it is determined that the subject is out of the first detection area.

The plurality of detection cameras may be installed around four corners constituting a sports stadium.

In addition, the at least one main camera may be installed in line with a center line of a sports stadium.

Advantageous Effects

According to the present invention, it is possible to efficiently mix a screen for each camera and transmit a broadcast without using excessive labor costs.

The effects obtainable in the present invention are not limited to the above-mentioned effects, and other effects not mentioned may be clearly understood by those skilled in the art to which the present invention belongs from the following description.

BEST MODE

Mode for Invention

In order to more clarify the features and advantages of the present invention, the present invention will be described in more detail with reference to specific embodiments of the present invention shown in the accompanying drawings. However, detailed descriptions of well-known functions or configurations that may obscure the gist of the present invention in the following description and accompanying drawings will be omitted. In addition, it should be noted that the same components are denoted by the same reference numerals throughout the drawings.

The terms and words used in the description below and drawing will not be construed as limited to a conventional or lexical meaning, and will be construed as the meanings and concepts consistent with the technical idea of the present invention based on the principle that an inventor may define the concept of the term properly in order to describe the invention in the best way. Thus, the embodiments described herein and the configurations shown in the drawings are merely exemplary embodiments according to the present invention, and may not represent all of the technical ideas of the present invention. Therefore, it will be understood that various equivalents and modifications may be substituted therefor at the time of filing of the present application.

In addition, terms including ordinal numbers such as first, second, etc. are used to describe various components, and are used only for the purpose of distinguishing one component from other components, without limiting the components. For example, a first element may be termed as a second element, and similarly, a second element may be termed as a first element, without departing from the scope of the present invention.

In addition, the terms used herein are intended only to describe specific embodiments, and are not intended to limit the present invention. The singular expression includes the plural expression unless the context clearly dictates otherwise. In addition, terms such as "comprises" or "have" described in the present specification are intended to designate that the features, numbers, steps, operations, components, parts, or combinations thereof described in the specification, and shall not be construed to preclude any possibility of the existence or addition of other features or numbers, steps, operations, components, parts, or combinations thereof.

In addition, terms such as "unit", "group", and "module" described in the specification mean a unit that processes at least one function or operation, which may be implemented as hardware, software or a combination of hardware and software. In addition, "a or an", "one", "the", and related terms thereof may be used in a sense including both the singular and the plural in the context of describing the invention (especially in the context of the following claims) unless indicated otherwise in the specification or clearly contradicted by the context.

In addition to the above-mentioned terms, specific terms used in the following description are provided to help the understanding of the present invention, and the use of these specific terms may be changed to other forms without departing from the technical spirit of the present invention.

In addition, embodiments within the scope of the present invention include computer-readable media having or transferring computer-executable instructions or data structures stored in the computer-readable media. Such computer readable media may be any available media that can be accessed by a general purpose or special purpose computer system. By way of example, such computer-readable media may be used to store or convey any program code means in the form of RAM, ROM, EPROM, CD-ROM, other optical disk storages, magnetic disk storage, other magnetic storages, computer-executable instructions, computer-readable instructions, or data structures and may include, but is not limited to, a physical storage medium such as any other medium that can be accessed by the general purpose or special purpose computer system.

In addition, the present invention may be implemented in a network computing environment having various types of computer system configurations including personal computers, laptop computers, handheld devices, multiprocessor systems, microprocessor-based or programmable consumer electronics, network PCs, minicomputers, mainframe computers, mobile telephones, PDAs, and pagers. The present invention may also be implemented in distributed system environments where both local and remote computer systems, which are linked by a wired data link, a wireless data link, or a combination of wired and wireless data links through a network, perform the tasks. In the distributed system environment, program modules may be located in local and remote memory storage devices.

Further, it will be understood that each block of the process flowchart and combinations of the flowcharts may be performed by computer program instructions. These computer program instructions may be installed a general purpose computer, a special purpose computer, or a processor of other programmable data processing equipment, so that the instructions executed by the computer or the processor of other programmable data processing equipment may create a means for performing functions described in the flowchart block(s). These computer program instructions may also be stored in a computer-usable or computer-readable memory that can direct a computer or other programmable data processing apparatus to function in a particular manner, such that the instructions stored in the computer-usable or computer-readable memory produce an article of manufacture including instruction means that implement the function specified in the flowchart block(s). The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Additionally, each block may represent a module, segment, or portion of code, which comprises one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

In describing the embodiments of the present disclosure in detail, an example of a specific system will be mainly targeted, but the main subject matter to be claimed in the present specification can be applied to other communication systems and services with a similar technical background within a range that does not deviate significantly the range disclosed in the specification, and this will be possible at the discretion of a person skilled in the art.

Hereinafter, description will be made for the sports broadcasting method according to an embodiment of the present invention.

Figure 1:
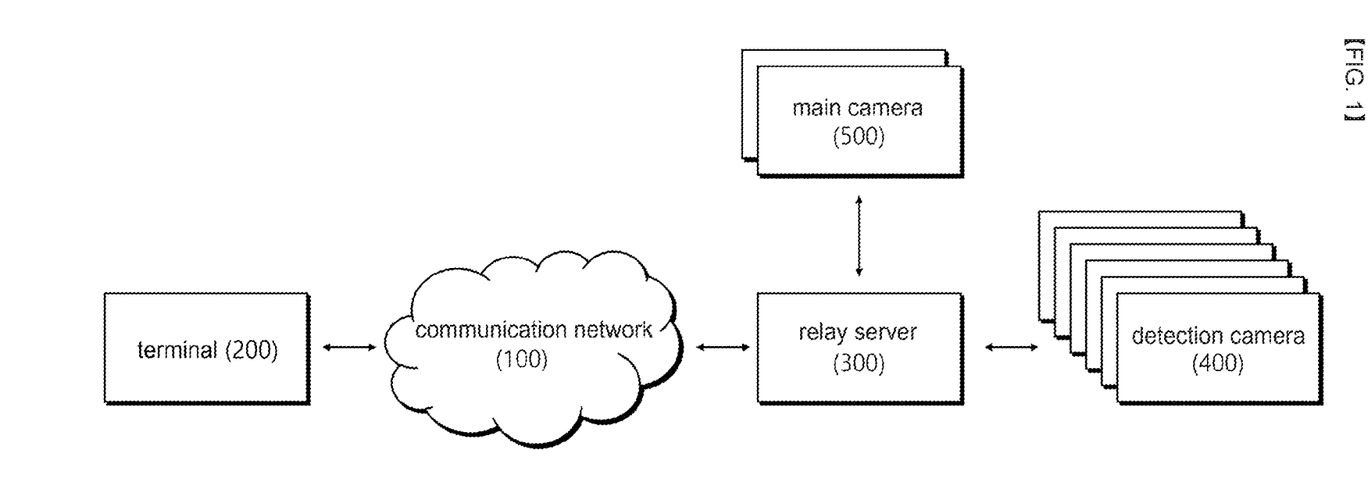
FIG. 1 is a view for explaining a system for broadcasting sports according to an embodiment of the present invention.

Referring to FIG. 1, a sports relay system according to an embodiment of the present invention may include a communication network 100, a terminal 200, a relay server 300, a detection camera 400, and a main camera 500.

Here, the terminal 200 may interwork with the relay server 300 through the communication network 100. In this case, the communication network 100 may be a wireless communication network. For example, the wireless communication network may be a wireless communication network using Long Term Evolution (LTE), 5G (5 Generation). WiFi, and the like.

The terminal 200 of the present invention refers to a users device capable of transmitting and receiving various data via the communication network 100 according to the manipulation of a user. The terminal 200 may perform voice or data communication through the communication network 100, and may transmit/receive information through the relay server 300 and the communication network 100. For this purpose, the terminal 200 of the present invention may include a memory for storing programs and protocols for transmitting and receiving data with the relay server 300, and a microprocessor for executing and controlling various programs.

The terminal 200 preferentially accesses an application (hereinafter, 'app') providing device (not shown) connected to the communication network 100, such as an app store, and receives an app for a sports relay service from the corresponding app store.

In addition, the terminal 200 may be implemented in various forms. For example, the terminal 200 described herein may be a mobile terminal such as a smart phone, a tablet PC, a personal digital assistant (PDA), a portable multimedia player (PMP), an MP3 player, etc., as well as a fixed terminal such as a smart TV or a desktop computer.

In addition, although it is impossible to enumerate all the terminal 200 of the present invention because there are too many variations of the mobile device according to the convergence trend of the digital device, a unit equivalent to the above-mentioned units may be used as the terminal 200 of the present invention. Any device can be used as the terminal 200 of the present invention so long as it can download and install an app related to the sports relay service according to the present invention.

The relay server 300 is a server device that transmits and receives various data and information to and from the terminal 200, the detection camera 400, and the main camera 500 for providing a sports relay service according to an embodiment of the present invention, and that mixes and stores an image captured by the detection camera 400 and the main camera 500 based on the various data and information, or transmitting it the image to the terminal 200.

The detection camera 400 is a device for transmitting and receiving various data and information with the relay server 300 in order to provide a sports relay service according to an embodiment of the present invention. In particular, a plurality of detection cameras 400 are installed around the four corners constituting the sports stadium, and the plurality of detection cameras 400 capture the detection area assigned thereto to transmit the capture image of the detection area to the relay server 300.

The main camera 500 is a device for transmitting and receiving various data and information with the relay server 300 in order to provide a sports relay service according to an embodiment of the present invention. In particular, the main camera 500 may be installed at a position in line with the center line of the sports stadium, and may be of a rotary type capable of rotating 180 degrees or more. The main camera 500 can capture the sports stadium as a whole while rotating, and can store angle information of the main camera 500 and the detection cameras 400 based on a reference point where the center of the installed main camera 500 is set to 0 degree. In this case, the reference point of the main camera 500 may be a position in line with the center line.

In addition, when the main camera 500 receives a control signal that directs the image capturing position toward the specific detection camera 400 from the relay server 300, the main camera 500 rotates by an angle corresponding to the specific detection camera 400 based on the stored angle information, so that the main camera 500 may be rotated such that the image capturing position of the main camera 500 is directed toward the specific detection camera 400.

FIGS. 2 to 5 are views for explaining an unmanned sports relay method according to an embodiment of the present invention.

Prior to the full description, the subject referred to in the present invention may mean a ball used in a sports game transmitted through a corresponding sports relay broadcast. For example, if the sports broadcast is for a soccer game, the subject may be a soccer ball, and if the sports broadcast is for a basketball game, the subject may be a basketball. In addition, the subject is not limited to a ball, and any object used for a sports game may be the subject. For example, if the corresponding sports broadcast is hockey, the subject may be a puck, if the corresponding sports broadcast is badminton, the subject may be a shuttlecock, and if the corresponding sports broadcast is curling, the subject may be a stone.

Hereinafter, an unmanned sports relay method according to an embodiment of the present invention will be described with reference to FIGS. 2 to 5.

Figure 2:
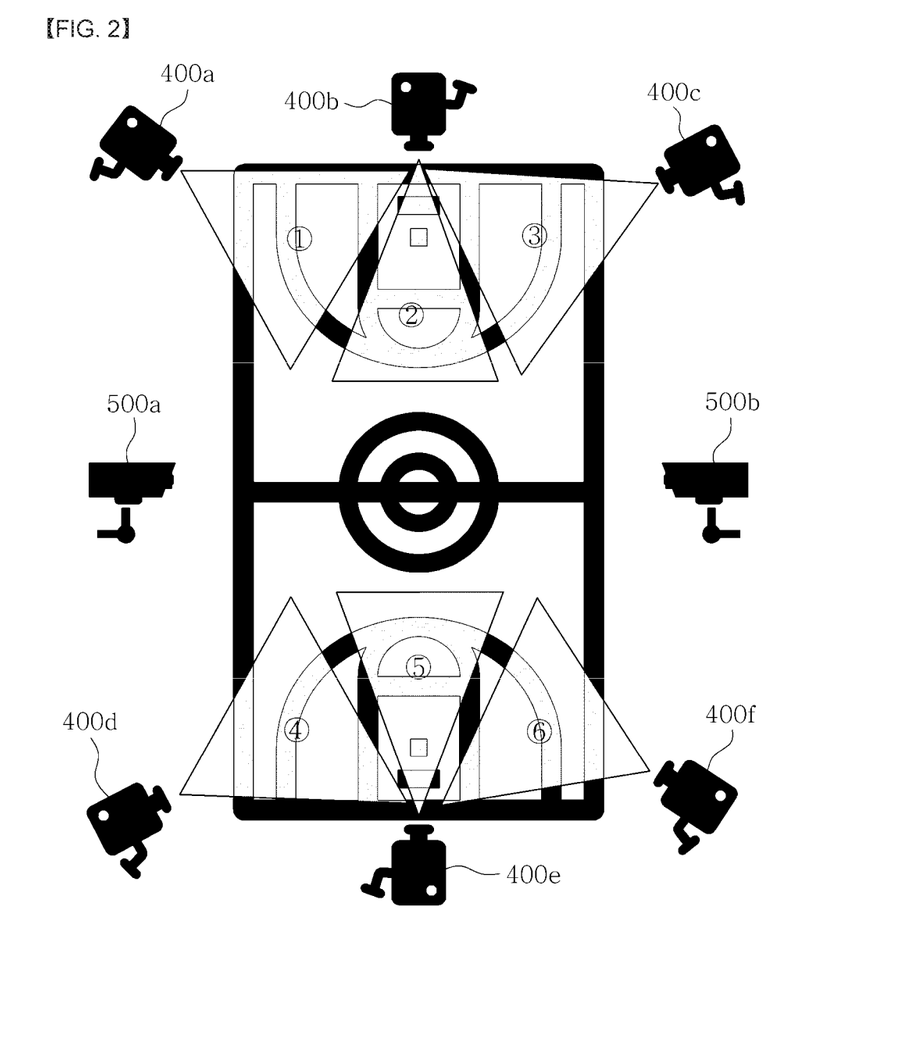
FIGS. 2 to 5 are views for explaining a sports relay method according to an embodiment of the present invention.

Referring to FIG. 2, a plurality of detection cameras 400 may be installed on both sides of the sports stadium about the center line. In addition, each of the detection cameras 400 may be assigned to each of the detection areas. For example, referring to FIG. 2, a first detection area is captured by a detection camera 400a, and a second detection area is captured by a detection camera 400b. In FIG. 2, it is indicated that each of the detection areas are assigned to each of six detection cameras, but this is only an example, and the number of detection cameras installed in the sports stadium may vary depending on the size of the sports stadium and the degree of dynamism of the sports.

In addition, each detection camera 400 may be fixed in one direction and installed to capture only the detection area assigned to each detection camera 400.

In addition, the detection area assigned to each detection camera 400 may be set based on a capture range that can be captured by each detection camera 400 at a location where each detection camera 400 is installed. In other words, the angle of the detection area assigned to each detection camera 400 may be smaller than or equal to the capture range that each detection camera 400 may capture. In addition, the length of the detection area assigned to each detection camera 400 may be set based on the length allowing each detection camera 400 to identify a subject. For example, based on the performance of the detection camera 400, if the detection camera 400 can recognize the subject even when the length of one diameter of the subject is 0.5 cm, the length of the detection area can be set as the length at which the length of one diameter of the subject can be seen as 0.5 cm based on zoom information and resolution information of the detection camera 400. Here, the zoom information may be information on a capturing magnification and a capture visible length of the detection camera 400. In other words, the zoom information may be information about the focal length of the detection camera 400.

In addition, a rotary type main camera 500 may be installed near the center line. The main camera 500 is installed in a rotatable manner, so that the image capturing position can be adjusted toward any one of the detection cameras 400. In addition, one or more main cameras 500 may be installed per one stadium.

For example, as shown in FIG. 2, two main cameras 500*a* and 500*b* may be installed at both ends of a point in line with the center line. In this case, each of the main cameras 500 may have the same resolution and the same zoom degree, but may have different resolutions and different zoom degrees.

For example, the main camera 500*a* may be set such that the main camera 500*a* can perform the zoom-in capture that is 1.5 times to 2.5 times higher than that of the main camera 500*b*.

Based on the above-described contents, a sports relay method according to an embodiment of the present invention will be described in detail with reference to FIG. 3.

Figure 3:
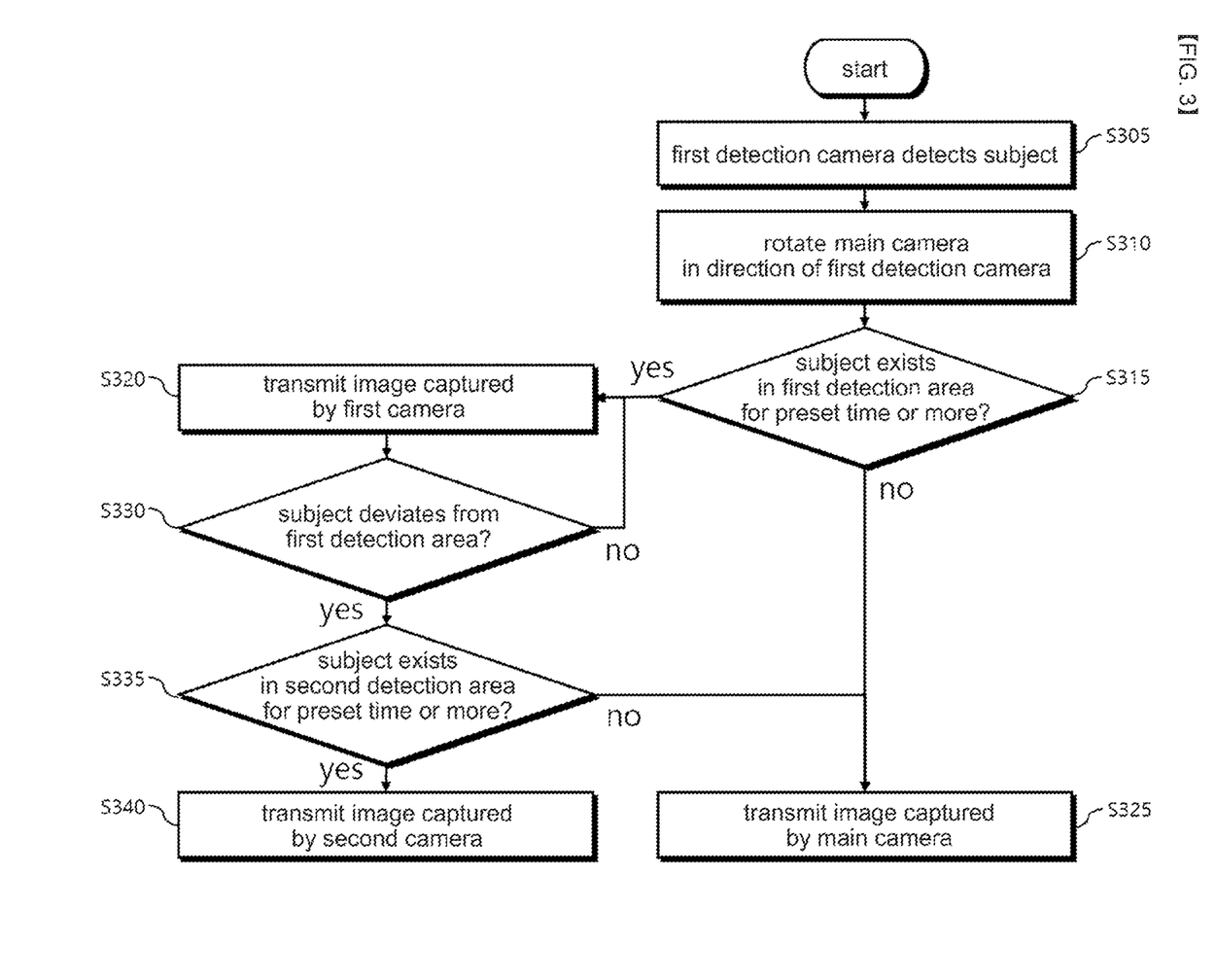

Referring to FIG. 3, among the detection cameras 400, the first detection camera 400 may detect a subject (S305). In this case, the detection cameras 400 may receive the color, shape, and size of the subject in advance using a camera image process, and detect the subject based on the color, shape, and size of the subject.

For example, when a basketball is a subject, if it is inputted that the basketball has a brown color, a circular shape, and a size of an official ball, an object may be recognized as the subject when the object having a certain magnification relationship with the brown color, circular shape, and size of the official ball is detected in the detection area of the corresponding detection camera 400. However, in the case of color, it may be slightly changed and the changed color may be recognized due to the production process, the lighting of the stadium, and the image capture performance of the detection camera. Accordingly, after setting a predetermined error range in detecting a color, if a color within the predetermined error range is recognized, it can be recognized that the subject is present in the corresponding detection area.

For example, when the color of the subject shared by the detection cameras 400 is RGB 184, 134, and 11, if the error range of each element is below a certain level, the detection camera 400 may recognize the subject.

When the first detection camera 400 transmits a signal indicating that the subject has been recognized to the relay server 300, the relay server 300 rotates the main camera 500 in the direction of the first detection camera 400, so that the main camera 500 may capture the stadium in the direction of the first detection camera 400 (S310).

In this case, the first detection camera 400 may observe the movement of the subject and report the movement to the relay server 300. In addition, the relay server 300 may determine whether the subject exists in the first detection area for a first time (for example, 1 to 2 seconds) or more (S315), and if it is determined that the subject exists, the relay server 300 can transmit an image captured by the first camera 400 to the terminal 200 (S320). In addition, when it is determined that the subject exists in the first detection area for less than the first time, the relay server 300 may transmit an image captured by the main camera 400 to the terminal 200 (S325).

Meanwhile, the relay server 300 may determine an image to be transmitted to the terminal 200 by predicting whether the subject exists in the first detection area for a predetermined time. For example, when the first detection camera 400 observes the movement of the subject and reports the movement to the relay server 300, the relay server 300 may estimate the moving speed and moving direction of the subject based on the movement of the object to determine whether the subject exists in the first detection area for a second time (for example, 3 to 5 seconds) or more. If it is determined that the subject will exist in the first detection area for the second time or more, an image captured by the first detection camera 400 may be transmitted to the terminal 200. In addition, if it is determined that the subject will exist in the first detection area for less than the second time and it is determined that the subject will be moved to another detection area, an image captured by the main camera 500 may be transmitted to the terminal 200.

For example, when the relay server 300 receives a report from the first detection camera 400, the moving distance of the subject in a unit time (for example, 0.1 second) within the capture screen capturing the first detection area is measured and multiplied by the magnification between the actual area or length of the first detection area and the area or length in the capture screen, so that it is possible to calculate the speed and direction of the subject moved per a unit time, and thus, the relay server 300 may determine whether the subject moves to another detection area within a time less than the second time, or whether the subject exists in the first detection area for a second time or more.

Based on the above, if it is determined that the subject will exist in the first detection area for a second time or more, the relay server 300 transmits the capture image of the first detection camera 400 to the terminal 200, and if it is determined that the subject will exist in the first detection area for less than the second time and the subject will move to another detection area, the capture image of the main camera 500 may be transmitted to the terminal 200.

The first detection camera 400 continuously observes the subject and may observe whether the subject deviates from the first detection area (S330). If the subject does not deviate from the first detection area, the image captured by the first detection camera 400 may be continuously transmitted to the relay server 300, and the relay server 300 may transmit the image to the terminal 200.

If it is determined that the subject is out of the first detection area, it may be determined whether the subject exists for a first time or more in the second detection area as described above or whether the subject will exist for the second time or more through the second detection camera 400 located immediately left or right of the first detection area (S335). For example, if the first detection camera 400 is the detection camera 400b shown in FIG. 2, it may be determined whether the subject exists in the detection area corresponding to the detection camera 400a or the detection camera 400c for a first time or more or whether the subject will exist for a second time or more. If the subject exists in the second detection area for a first time or more or will exist for a second time or more, the relay server 300 may receive the image of the second detection camera 400 and transmit the image to the terminal 200 (S340). If the subject does exist in the second detection area for a first time or more or it is predicted that the subject will not exist for a second time or more, the relay server 300 may transmit the image captured by the main camera 500 to the terminal 200 (S320). In this case, the main camera 500 may rotate such that the image capturing position can be changed to the direction of the second detection camera 400. For example, when the subject is recognized by the second detection camera 400 after the subject is out of the first detection area, the main camera 500 may be rotated such that the image capturing position can be directed toward the second detection camera 400.

In addition, based on the moving speed and the moving direction of the subject analyzed by the relay server 300, it is determined whether the subject moves to the left or right in the first detection area, and if it is determined that the subject is out of the first detection area, the main camera 500 may rotate such that the image capturing position of the main camera 500 can be changed to the direction of the detection camera 400 located in the moving direction.

Figure 4:
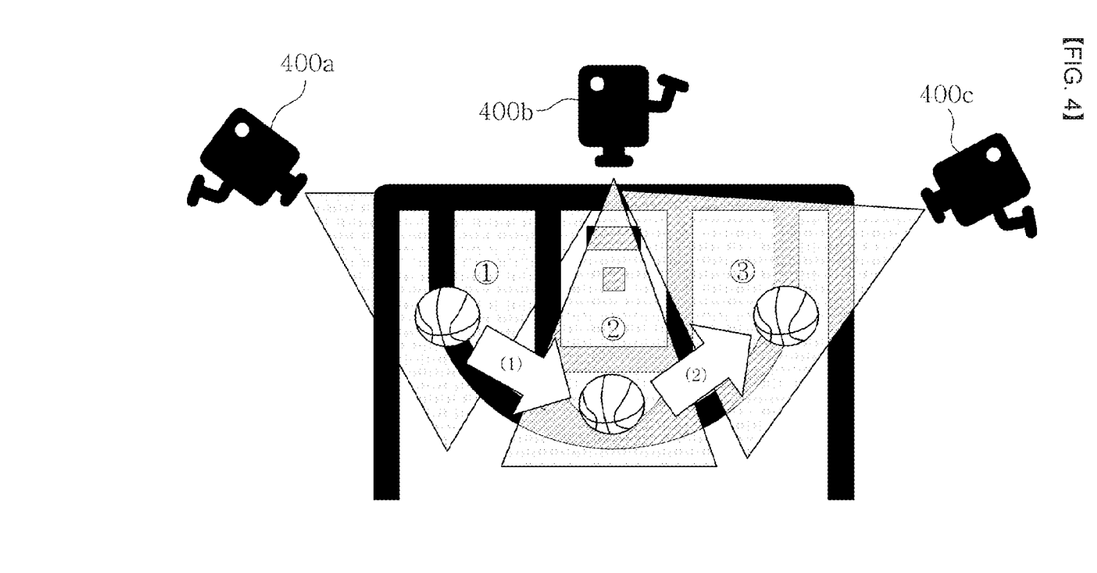

For example, as shown in FIG. 4, when the relay server 300 determines that the subject moves in the right direction in the first detection area of the first detection camera 400a, and determines that the subject deviates from the first detection area, the relay server 300 may control the main camera 500 to rotate such that the image capturing position can be changed to the direction of the second detection camera 400b. In addition, if it is determined that the subject continues to move to the right in the second detection area of the second detection camera 400b and it is determined that the subject deviates from the second detection area, the relay server 300 may control the main camera 500 to rotate such that the image capturing position can be changed to the direction of the third detection camera 400c. In addition, when the subject exists for a first time or more while moving to the right in the second detection area and or is expected to exist for a second time or more, the capture image of the second detection camera 400b may be transmitted to the terminal 200.

Figure 5:
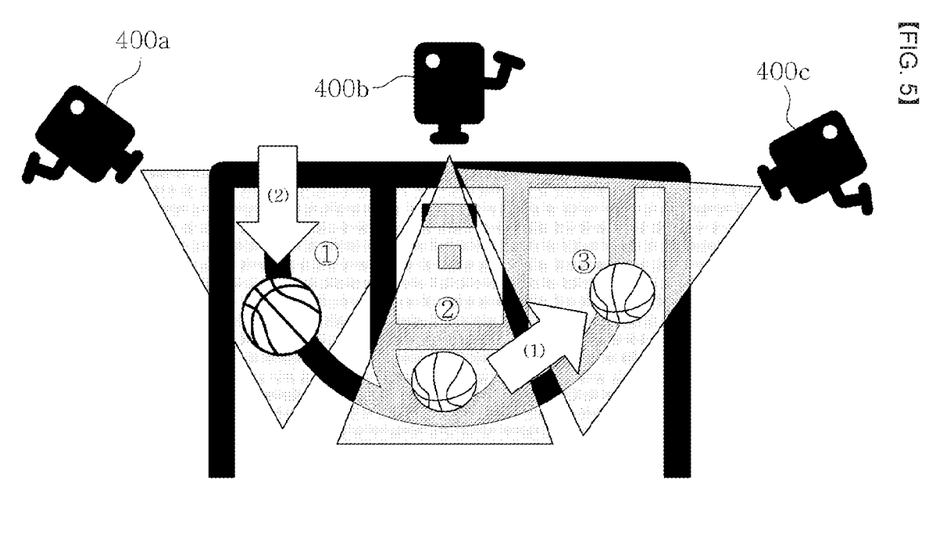

Meanwhile, referring to FIG. 5, after the subject is recognized by the second detection camera 400b, it is determined that the subject moves to the right based on the moving direction and moving speed of the subject estimated by the relay server 300, and the subject may be recognized in the third detection area of the third detection camera 400c.

However, at the same time the subject is recognized in the third detection area of the third detection camera 400c or after the subject is recognized in the third detection area, the subject may be recognized in the first detection area of the first detection camera 400a. For example, when a ball other than a currently playing ball comes in from the outside by the mistake or for the purpose of interrupting the game, the subject may be found in a direction that is unpredictable based on the movement of the subject.

Therefore, when the subject is recognized in the direction that does not match the moving speed and the moving direction estimated by the relay server 300, that is, when the subject is recognized in the first detection area or the second detection area located to the left of the third detection area although the subject is recognized in the third detection area and it is estimated that the subject continues to move to the right, the relay server 300 recognizes the subject as a subject that does not relate to the game, and ignores the subject.

In other words, in the case of FIG. 5, after the subject is recognized in the third detection area, the subject recognized in the first detection area is recognized as a subject that does not relate to the game, so that the image of the first detection camera 400a is not transmitted to the terminal. 200, and the image capturing position of the main camera 500 may be maintained in the direction of the third detection camera 400c without rotating the image capturing position to the direction of the first detection camera 400a.

In addition, even if the subject is recognized in a detection area that is not continuous (that is, not adjacent) to the detection area in which the current subject is recognized, it is determined that the subject is not related to the game, so that the relay server 300 may not transmit the image of the detection camera 400 of the detection area to the terminal 200 and may not rotate the main camera 500.

For example, in FIG. 5, when the subject is found in the second detection area adjacent to the third detection area after the subject is recognized in the third detection area, it may be determined that the moving direction of the subject is rapidly changed so that the subject moves to the second detection area. However, after the subject is recognized in the detection area, if the subject is recognized in the first detection area that is not adjacent to the detection area, it is determined that the subject recognized in the first detection area is a subject that is not related to the game, so that so that the relay server may not transmit the image of the first detection camera 400a to the terminal 200 and may not rotate the main camera 500 in a direction toward the first detection camera 400a.

In addition, if it is determined that the subject has moved out of the outline of the stadium after the subject is recognized in the third detection area, since the game is highly likely to resume at the outline of the third detection area, the relay server 300 may transmit the capture screen of the third detection camera 400c to the terminal 200 or may rotate the image capturing position of the main camera 500 in the direction toward the third detection camera 400c, and then transmit the image of the main camera 500 to the terminal 200.

In addition, after the subject is recognized in the third detection area, if it is determined that the subject has moved out of the outline of the stadium and the subject is recognized in any one of the detection areas, the relay server 300 may determine whether the subject relates to the game by analyzing the game situation.

For example, after the subject is recognized in the third detection area, when it is determined that the subject has moved out of the outline of the game, the uniform of the player who owns the subject may be analyzed. In other words, the relay server 300 may store the uniform color of the home team (for example, 'red') and the uniform color of the away team (for example, 'blue') of the corresponding game, and may determine that the uniform color of the player who lastly owns the subject before the subject moves out of the outline of the game is 'blue' through analysis. In addition, when the subject is recognized in a specific detection area again after the subject has moved out of the outline of the game, if the uniform color of the player who owns the subject is 'red', the subject is considered as a subject related to the game, so that the main camera 500 is rotated such that the image capturing position can be changed in the direction toward the detection camera 400 of the detection area where the subject is found, and the image of the detection camera 400 of the corresponding detection area or the image of the main camera 500 is transmitted to the terminal 200. In a state in which the uniform color of the last player before the subject moves out of the outline of the game is analyzed as 'blue', if the uniform color of a player who owns the subject is also 'blue' when the subject is recognized again in a specific detection area after the subject moves out of the outline of the game, the subject is considered as a subject that is not related to the game, so that the image of the detection camera 400 capturing the subject may not be transmitted, and the main camera 500 is not rotated to the direction toward the detection camera 400.

Meanwhile, after the plurality of detection cameras 400 recognize the subject, the subject may suddenly disappear and thus cannot be recognized. For example, when other players surround and defend a player who is dribbling with the subject, the subject is covered by the players, so that the subject is not recognized by any of the detection cameras 400 among the plurality of detection cameras 400.

In this case, the relay server 300 estimates a detailed area inside the corresponding detection area and/or the detection area where the current object is expected to exist based on the moving direction and moving speed of the object between the detection area where the subject is lastly recognized and the adjacent detection area. Here, the detailed area may mean an area obtained by dividing the detection area in a predetermined unit.

In addition, the uniform color of the player is tracked in the detection area and/or the detailed area. The relay server 300 that has identified the positions of the players based on the uniform color may track the positions of the hands or feet of the players. Since the subject will be in close contact with the hands or feet of the players, it can be assumed that the subject is owned by the players whose fingertips or toes are covered.

Therefore, the detection camera 400 in charge of the corresponding detection area tracks the position of the hands or feet of the players, and among several players, if a tip of a hand or foot of a player is not recognized because it is obscured by other players, it is determined that the player owns the subject. Thus, the image captured by the detection camera 400 of the detection area where the player is located is transmitted to the terminal 200, or the image capturing position of the main camera 500 is rotated in the direction toward the detection camera 400 to transmit the capture image of the main camera 500 to the terminal 200.

Meanwhile, referring to FIG. 2, there may be a plurality of main cameras 500. For example, there may be two main cameras 500. In this case, the two main cameras 500 may take pictures with different zooms (that is, different focal lengths). However, the two main cameras 500 may take pictures with the same zoom (that is, the same focal length).

The two main cameras 500 may rotate to change the image capturing position in the direction toward the detection camera 400 of the detection area where the subject is recognized according to the control of the relay server 300. In addition, the two main cameras 500 may transmit the capture image to the relay server 300.

When the image of the main camera 500 is transmitted to the terminal 200, the relay server 300 may transmit the image captured by any one of the two main cameras 500 to the terminal 200. For example, if the two main cameras 500 take pictures with different zooms (that is, different focal lengths), the relay server 300 estimates the speed of the subject, and when the speed is greater than or equal to a certain value, the capture image of the main camera 500, which is relatively zoomed out (that is, having a relatively long focal length), may be transmitted to the terminal 200. Conversely, when the speed of the subject is less than a certain value, the capture image of the main camera 500, which is a relatively zoomed-in (that is, having a relatively short focal length) may be transmitted to the terminal 200.

Meanwhile, when it is determined to transmit the relatively zoomed-in image of the main camera 500 to the terminal 200, if it is expected that the subject may exist in the detection area for the first time or more or the second time or more, it may be necessary to determine whether to transmit the image of the detection camera 400 corresponding to the detection area to the terminal 200 or whether to transmit the zoomed-in capture image of the main camera 500 to the terminal 200.

In this case, the capture image of the camera in which the subject is better recognized may be transmitted to the terminal 200. For example, in FIG. 2, in a state in which the main camera 500a is a zoomed-in main camera and it is expected that the subject may exist in the first detection area of the first detection camera 400a for the first time or more or the second time or more, if the subject is not recognized by the first detection camera 400a because a specific player is being surrounded by other players, and as described above, if it is assumed that the specific player owns the subject because the fingertips or toes of the specific player are obscured, and if the main camera 500a can recognize the subject owned by the specific player through the back of the specific player, the relay server 300 may transmit the image captured by the main camera 500a to the terminal 200.

Meanwhile, when the relay server 300 transmits an image to the terminal 200, the audio of the stadium may also be transmitted. In this case, audio data may be recorded by a plurality of microphones installed in the stadium. In addition, at this time, since the relay server 300 transmits the audio data and the video data in a separate packet form rather than in a combined form, the sync of the audio data and the video data may not match in the terminal 200, so it may be inconvenient for the consumer to watch the image reproduced in the terminal 200.

For this reason, the relay server 300 may transmit the location of the subject in the video data, the detection camera 400 and/or the detection area corresponding to the video data, and matching information that matches playback time, sound waveform, etc. of the audio data when transmitting the video data and the audio data together to the terminal 200.

The terminal 200 that has received the video data, the audio data, and the matching information determines whether the video data and the audio data are being received with correct sync based on the matching information. If it is determined that the playback from the terminal 200 is unnatural due to the incorrect sync, the playback speed of the video data may be adjusted to be slow or fast based on the matching information.

For example, if it is determined that the audio output from the current terminal 200 corresponds to an image after the image being currently reproduced, so the audio output is fast, the playback speed of the video data can be increased to 1.1 times to 1.2 times, etc. Meanwhile, if it is determined that the audio output from the current terminal 200 corresponds to an image before the image being currently reproduced, so the audio output is slow, the playback speed of the video data may be reduced by 0.8 to 0.9 times, or the like.

Figure 6:
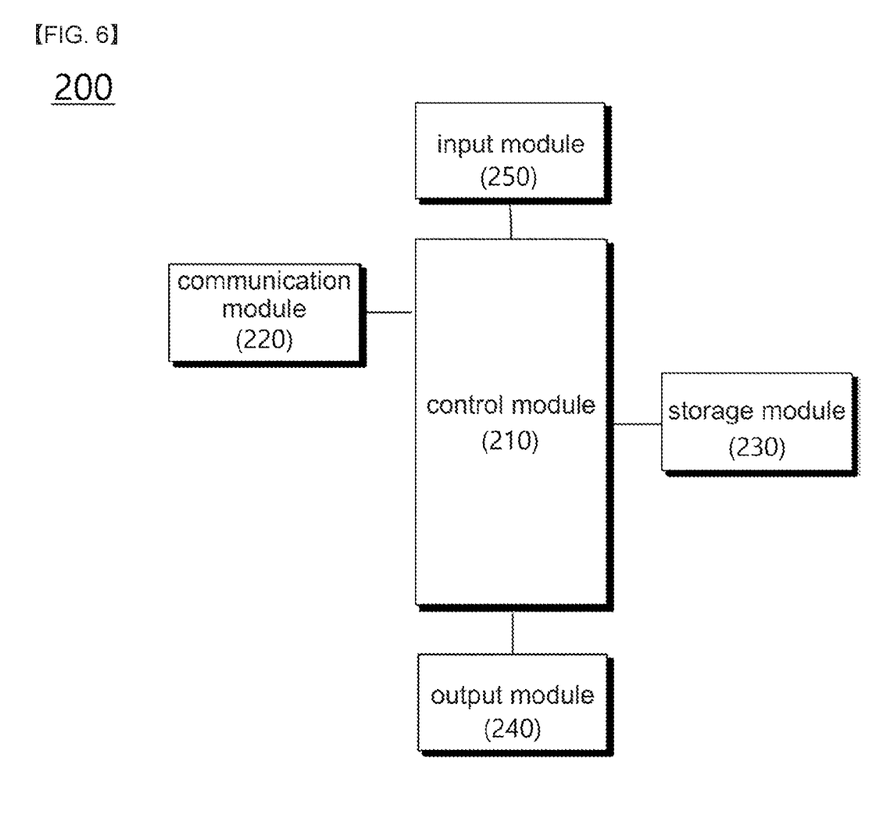
FIGS. 6 to 8 are views explaining the configuration of devices for implementing an embodiment of the present invention.
Figure 7:
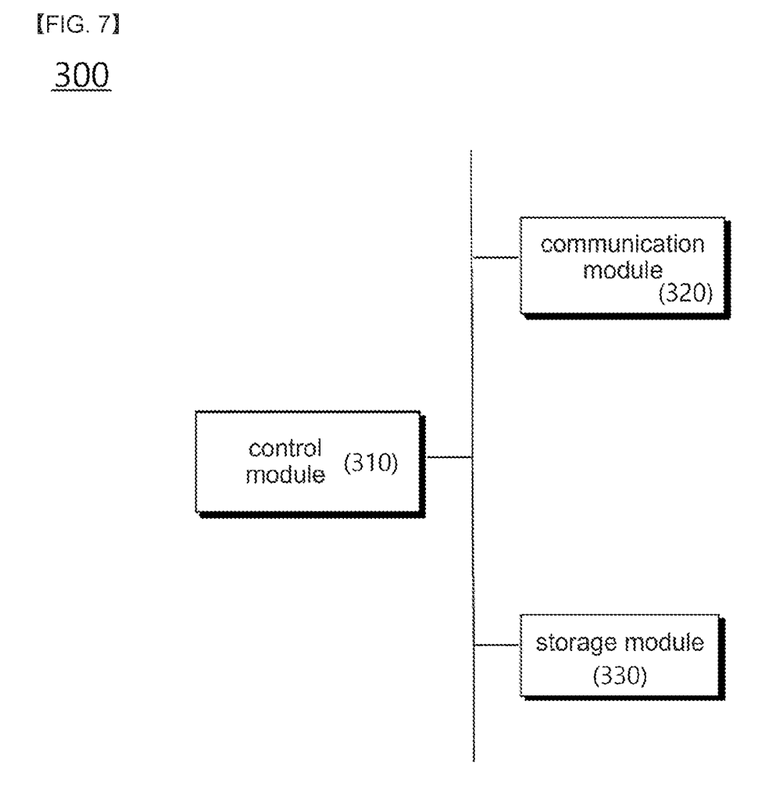
Figure 8:
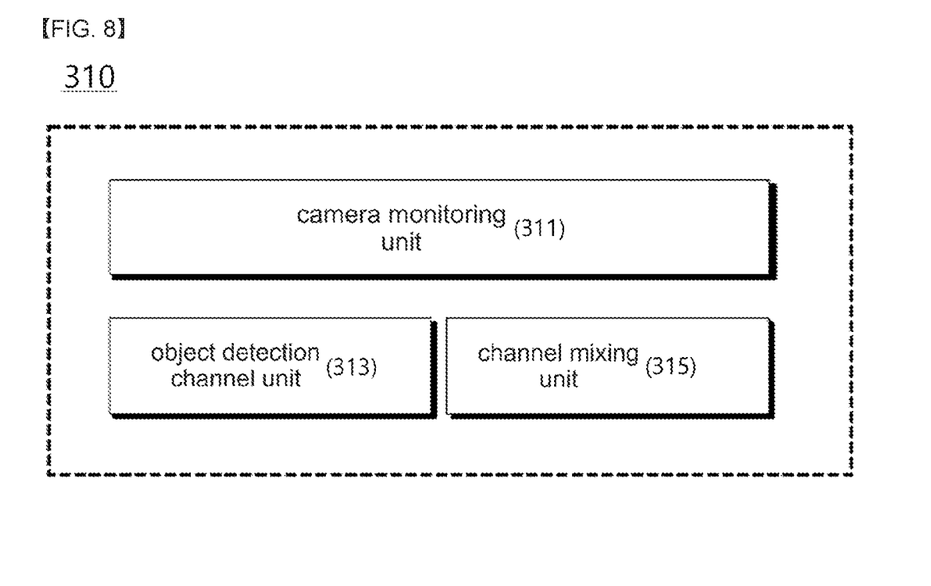

FIGS. 6 to 8 are block diagrams illustrating the configuration of an apparatus for implementing the above-described embodiment of the present invention.

FIG. 6 is a block diagram for explaining the configuration of the terminal 200 for implementing the above-described embodiment of the present invention.

Referring to FIG. 6, the terminal 200 may include a control module 210, a communication module 220, a storage module 230, an output module 240, an input module 250, and the like.

The input module 250 receives various information such as number and character information, and transmits input signals related to setting various functions and controlling functions of the terminal 200 to the control module 250. In addition, the input module 250 may be configured to include at least one of a keypad and a touchpad that generate an input signal according to a touch or manipulation of a user. In this case, the input module 250 may be configured in the form of a single touch panel (or touch screen) together with the output module 240 to simultaneously perform input and display functions. In addition, the input module 250 may include all types of input devices that may be developed in the future in addition to the input devices such as a keyboard, a keypad, a mouse, a joystick, and the like. In particular, the input module 250 according to the present invention detects input information input from the user and transmits the input information to the control module 210.

The output module 240 displays information about a series of operation states and operation results that occur while the function of the terminal 200 is performed. In addition, the output module 240 may display a menu of the terminal 200 and user data input by the user. Here, the output module 240 may include a liquid crystal display (LCD), a thin film transistor liquid crystal display (TFT-LCD), a light emitting diode (LED), an organic light emitting diode (OLED), an active matrix organic light emitting diode (AMOLED), a retina display, a flexible display, and a three-dimensional display. In this case, when the output module 330 is configured in the form of a touch screen, the output module 240 may perform some or all of the functions of the input module 250.

The storage module 230 is a device for storing data and includes a main storage device and an auxiliary storage device to store an application program required for a functional operation of the terminal 200. The storage module 230 may largely include a program area and a data area. Here, when each function is activated in response to the request from the user, the terminal 200 executes corresponding application programs under the control of the control module 210 to provide each function.

The communication module 220 may transmit/receive data to and from the relay server 300 through the communication network 100. In addition, the communication module 220 includes an RF transmitting means for up-converting and amplifying the frequency of the transmitted signal, an RF receiving means for low-noise amplifying a received signal and down-converting the frequency, and a data processing means for processing a communication protocol depending on a specific communication scheme. The communication module 220 may include at least one of a wireless communication module (not shown) and a wired communication module (not shown). In addition, the wireless communication module has a configuration for transmitting and receiving data depending on the wireless communication scheme, and when the terminal 200 uses the wireless communication, data may be transmitted to and received from the relay server 300 by using any one of a wireless network communication module, a wireless LAN communication module, and a wireless PAN communication module. Here, the communication module 220 may include a plurality of communication modules. When a plurality of communication modules are included in the communication module 220, one communication module may perform personal area network (PAN) communication including Bluetooth.

In addition, the other communication module communicates with the relay server 300 through the communication network 100. Here, the other communication module may use a wireless communication method such as Wireless LAN (WLAN), Wi-Fi, Wibro, Wimax, and High Speed Downlink Packet Access (HSDPA).

The control module 210 may be a process device for driving an operating system (OS) and each component.

Accordingly, the control module 210 of the terminal 200 may control to transmit the signal received through the input module 250 to the relay server 300 through the communication module 220, and to expose beacon, Wi-Fi, and base station signals transmitted from the communication module 220, or information transmitted from the relay server 300 through the output module 240.

In addition, the control module 210 of the terminal 200 may control the overall operation process of the terminal 200 according to an embodiment of the present invention. In other words, the overall operation process of the terminal 200 according to the embodiments of the present invention described above based on FIGS. 1 to 5 may be controlled by the control module 210.

FIG. 7 is a block diagram illustrating a configuration of a relay server 300 for implementing embodiments of the present invention.

Referring to FIG. 7, the relay server 300 may include a control odule 310, a communication module 320, and a storage module 330.

The communication module 320 is for communicating with the terminal 200, and a communication network to perform the functions of the communication module 320 may preferably adopt a wireless communication method such as WLAN (Wireless LAN), Wi-Fi, Wibro, Wimax, and High Speed Downlink Packet Access (HSDPA), but is not limited thereto. Depending on the system implementation method, a wired communication method such as Ethernet, xDSL (ADSL, VDSL), Hybrid Fiber Coaxial Cable (HFC), Fiber to The Curb (FTTC), Fiber To The Home (FTTH), etc. may be used.

The storage module 330 is a device for storing data and includes a main storage device and an auxiliary storage device to store an application program necessary for the functional operation of the relay server 300. The storage module 330 may largely include a program area and a data area. Here, when each function is activated in response to the request of the terminal 200, the relay server 300 provides each function by executing the corresponding application programs under the control of the control module 310.

The control module 310 may be a process device for driving an operating system (OS) and each component.

Accordingly, the control module 310 of the relay server 300 may control the overall operation process of the relay server 300 according to an embodiment of the present invention. In other words, the overall operation process of the relay server 300 according to the embodiments of the present invention described above based on FIGS. 1 to 5 may be controlled by the control module 310.

FIG. 8 is a view for explaining a specific configuration of the control module 310 of the relay server 300. Referring to FIG. 8, the control module 310 of the relay server 300 may include a camera monitoring unit 311, an object detection channel unit 313, and a channel mixing unit 315.

The camera monitoring unit 311 may include a plurality of monitoring processing, and may be connected with each of the detection cameras 400 in one-to-one correspondence to determine whether a subject is recognized in an image captured by each of the detection cameras 400.

The object detection channel unit 313 receives the capture image of the detection camera 400 in which the subject is recognized through the camera monitoring unit 311, analyzes the image, and determines whether the subject exists in the image for a first time or more or whether it is expected that the subject will exist for a second time or more. In addition, it is possible to control the main camera 500 to rotate in the direction toward the detection camera 400 for capturing the subject. In addition, an image captured by the detection camera 400 and/or the main camera 500 may be transmitted to the channel mixing unit 315.

The channel mixing unit 315 mixes the images received from the object detection channel unit 313 and transmits the images to the terminal 200 through the communication network 100 in real time, or stores the mixed image in the storage module 330. Meanwhile, the channel mixing unit 315 may generate matching information between video data and audio data, and this matching information may be transmitted to the terminal 200 through the communication network 100 or stored in the storage module 330.

As described above, while the specification contains details of numerous specific implementations, these should not be construed as a limitation for the scope of any invention or claim, but may be construed as description for the features of specific embodiments of specific inventions. Specific features that are described herein in the context of separate embodiments may be implemented in combination in a single embodiment. Conversely, various features that are described in the context of a single embodiment may also be implemented in multiple embodiments, either individually or in any suitable sub-combination. Furthermore, although features operate in a particular combination and may be initially depicted as claimed as such, one or more features from a claimed combination may in some cases be excluded from the combination, and the claimed combination may be exchanged with a sub-combination or a modification of a sub-combination.

Likewise, although operations are depicted in the drawings in a particular order, they are represented for the purpose of obtaining the desired result. It should not be construed that such operations must be performed according to specific order or sequential order, or that all illustrated operations must be performed. In certain cases, multitasking and parallel processing may be advantageous. Further, the separation of the various system components of the above-described embodiments should not be construed as requiring such separation in all embodiments, and the program components and systems described may generally be integrated together into a single software product or packaged into multiple software products.

Specific embodiments of the subject matter in the specification have been described. Other embodiments are within the scope of the following claims. For example, operations recited in the claims may be performed in a different order and still achieve desirable results. As an example, the processes illustrated in the accompanying drawings do not necessarily require the specific illustrated order or sequential order to achieve desirable results. In certain implementations, multitasking and parallel processing may be advantageous.

The present description sets forth the best mode of the invention, and provides examples to illustrate the invention to enable any person skilled in the art to make and use the invention. The written specification does not limit the present invention to the specific terms presented in the specification. Accordingly, although the present invention has been described in detail with reference to the above-described examples, those skilled in the art can make modifications, changes, and substitutions to the examples without departing from the scope of the present invention.

Therefore, the scope of the present invention should not be defined by the described embodiments, but should be defined by the claims.

INDUSTRIAL APPLICABILITY

The present invention relates to an unmanned sports relay service method using camera position control and image editing through real-time image analysis and an apparatus therefor, relates to a method of transmitting and producing a video by automatically editing the screen during broadcasting of various sports such as soccer, basketball, and volleyball through real-time image analysis and a camera position control, and relates to a service method to produce relay videos with various screen configurations by applying S/W to automate a part where a sender manually switches the screen using a video mixer while monitoring screens of several cameras when broadcasting from an existing broadcasting company.

According to the present invention, it is possible to efficiently mix a screen for each camera and transmit a broadcast without using excessive labor costs.

Therefore, the present invention can contribute to the overall development of the sports relay industry by providing an unmanned sports relay service method and an apparatus therefor using camera position control and image editing through real-time image analysis, and has sufficient potential for marketing or sales. Since the present invention can be practically implemented in reality, it has the industrial applicability.

The invention claimed is:

1. A method for transmitting a sports relay broadcast using a relay server interworking with a plurality of detection cameras and at least one main camera, the method comprising:
   detecting a subject in a first detection area among detection areas respectively corresponding to the plurality of detection cameras by using a first detection camera corresponding to the first detection area;
   controlling an image capturing position of the at least one main camera to be directed toward the first detection camera;
   transmitting an image captured by the first detection camera to a terminal when the subject is detected in the first detection area for a predetermined time or more; and
   transmitting the image captured by the at least one main camera to the terminal when the subject is detected in the first detection area for less than a predetermined time or it is determined that the subject is out of the first detection area, wherein detecting the subject through the first detection camera includes: receiving a shape, a size and a color of the subject, recognizing an object as the subject when the object sensed in the first detection area has a same shape as the subject and a constant magnification relationship with the subject in size, and when an error between an RGB value of the color of the subject and an RGB value of the color of the object is within a predetermined error range; and estimating a moving direction and a moving speed of the subject, controlling the image capturing position of the at least one main camera to be directed toward the first detection camera includes: controlling the image capturing position of the at least one main camera not to rotate in a direction of the first detection camera when the first detection area is located in a direction opposite to a moving direction of the subject in a second detection area where the subject is previously detected, or when the first detection area is not adjacent to the second detection area; controlling the image capturing position of the at least one main camera not to rotate in the direction of the first detection camera in case a uniform color of a player who lastly owns the subject before the subject moves out of an outline is identical to a uniform color of a player who owns the subject in the first detection area, when the subject is detected in the first detection area after it is determined that the subject is out of the outline in the second detection area; and controlling the image capturing position of the at least one main camera to rotate in the direction of the first detection camera when the uniform color of a player who lastly owns the subject before the subject moves out of the outline is different from the uniform color of a player who owns the subject in the first detection area, wherein the method further comprises: estimating a third detection area where the subject is expected to exist based on the moving direction and moving speed of the subject when it is detected that the subject has disappeared after detecting the subject; and recognizing that a second player who is not recognized because a tip of a hand or foot is obscured by a first player in the third detection area owns the subject, and when the at least one main camera is two and focal lengths of the two main cameras are different from each other, transmitting the image captured by the at least one main camera to the terminal further includes: transmitting the image captured by the main camera having a relatively long focal length to the terminal when the moving speed of the subject is greater than or equal to a predetermined value; and transmitting the image captured by the main camera having a relatively short focal length to the terminal when the moving speed of the subject is less than the predetermined value.

2. The method of claim 1, wherein the subject includes a ball used in a sports game transmitted through the sports relay broadcast.

3. The method of claim 1, wherein the first detection area is set based on a capturing range of the first detection camera.

4. A sports relay broadcast system comprising:
a plurality of detection cameras for capturing each of different detection areas included in the sports stadium;
at least one main camera rotatably installed in a direction of a detection camera corresponding to a detection area where the subject is detected from among the different detection areas; and a relay server configured to detect the subject in a first detection area from among the different detection areas by using a first detection camera corresponding to the first detection area, control an image capturing position of the at least one main camera to be directed toward the first detection camera, transmit an image captured by the first detection camera to a terminal when the subject is detected in the first detection area for a predetermined time or more, and transmit the image captured by the at least one main camera to the terminal when the subject is detected in the first detection area for less than a predetermined time or it is determined that the subject is out of the first detection area, wherein the relay server detects the subject through the first detection camera by: receiving a shape, a size and a color of the subject; recognizing an object as the subject when the object sensed in the first detection area has a same shape as the subject and a constant magnification relationship with the subject in size, and when an error between an RGB value of the color of the subject and an RGB value of the color of the object is within a predetermined error range; and estimating a moving direction and a moving speed of the subject, the relay server controls the image capturing position of the at least one main camera to be directed toward the first detection camera by: controlling the image capturing position of the at least one main camera not to rotate in a direction of the first detection camera when the first detection area is located in a direction opposite to a moving direction of the subject in a second detection area where the subject is previously detected, or when the first detection area is not adjacent to the second detection area; controlling the image capturing position of the at least one main camera not to rotate in the direction of the first detection camera in case a uniform color of a player who lastly owns the subject before the subject moves out of an outline is identical to a uniform color of a player who owns the subject in the first detection area, when the subject is detected in the first detection area after it is determined that the subject is out of the outline in the second detection area; and controlling the image capturing position of the at least one main camera to rotate in the direction of the first detection camera when the uniform color of a player who lastly owns the subject before the subject moves out of the outline is different from the uniform color of a player who owns the subject in the first detection area, the relay server further estimates a third detection area where the subject is expected to exist based on the moving direction and moving speed of the subject when it is detected that the subject has disappeared after detecting the subject, and recognizes that a second player who is not recognized because a tip of a hand or foot is obscured by a first player in the third detection area owns the subject, and when the at least one main camera is two and focal lengths of the two main cameras are different from each other, the relay server further transmits the image captured by the at least one main camera to the terminal by: transmitting the image captured by the main camera having a relatively long focal length to the terminal when the moving speed of the subject is greater than or equal to a predetermined value; and transmitting the image captured by the main camera having a relatively short focal length to the terminal when the moving speed of the subject is less than the predetermined value.

5. The sports relay broadcast system of claim 4, wherein the plurality of detection cameras are installed around four corners constituting a sports stadium.

6. The sports relay broadcast system of claim 4, wherein the at least one main camera is installed in line with a center line of a sports stadium.

\* \* \* \* \*